United States Patent [19]

Laurenty

[11] Patent Number: 5,111,596
[45] Date of Patent: May 12, 1992

[54] DRYING PROCESS AND TOWER FOR PRODUCTS IN GRAIN FORM

[76] Inventor: François Laurenty, 52 Rue Lenain de Tillemont, 93100 Montreuil, France

[21] Appl. No.: 548,625

[22] Filed: Jul. 5, 1990

[30] Foreign Application Priority Data

Jul. 6, 1989 [FR] France .................................. 89 09143

[51] Int. Cl.⁵ .................... F26B 17/00; F26B 17/12
[52] U.S. Cl. ...................................... 34/57 A; 34/169; 34/174; 34/77
[58] Field of Search .................... 34/32, 40, 72, 73, 74, 34/76, 77, 78, 79, 165, 168, 169, 174, 57 A, 57 R, 17

[56] References Cited

U.S. PATENT DOCUMENTS

| | | |
|---|---|---|
| 1,452,166 | 4/1923 | Niese . |
| 1,553,944 | 9/1925 | Laughlin . |
| 1,782,244 | 11/1930 | Nagel . |
| 2,567,940 | 9/1951 | Karrer et al. ............................ 34/32 |
| 3,611,585 | 10/1971 | Nara . |
| 4,294,020 | 10/1981 | Evans . |
| 4,337,584 | 7/1982 | Johnson . |
| 4,526,731 | 7/1985 | Henderson . |
| 4,601,113 | 7/1986 | Draper et al. . |
| 4,601,115 | 7/1986 | Draper et al. ............................ 34/32 |
| 4,602,438 | 7/1986 | Draper et al. ....................... 34/32 X |
| 4,619,053 | 10/1986 | Schumacher . |

FOREIGN PATENT DOCUMENTS

| | | |
|---|---|---|
| 82917 | 4/1982 | Australia . |
| 0129171 | 12/1984 | European Pat. Off. . |
| 0299279 | 1/1989 | European Pat. Off. . |
| 287155 | 9/1915 | Fed. Rep. of Germany . |
| 969061 | 4/1958 | Fed. Rep. of Germany . |
| 2928962 | 2/1981 | Fed. Rep. of Germany . |
| 528430 | 8/1921 | France . |
| 1011448 | 4/1952 | France . |
| 2336970 | 7/1977 | France . |
| 2539586 | 7/1984 | France . |
| 110335 | 6/1925 | Switzerland . |
| 227836 | 10/1943 | Switzerland . |
| 156963 | 1/1921 | United Kingdom . |
| 364762 | 1/1932 | United Kingdom . |

Primary Examiner—Henry A. Bennet
Attorney, Agent, or Firm—Young & Thompson

[57] ABSTRACT

The application describes a drying process and a fully electric drying device consuming from 80 to 140 KWH of electricity per ton of water evaporated. One and the same drying fluid (air, gas or steam) saturated with steam at a temperature of Θ0 rises, gradually becoming laden with steam, after each of the numerous fluidized drying stages for granulous products descending in the opposite direction. Between each drying stage, the drying fluid is superheated by crossed tubes (14) maintained at a temperature Θ2 approximately 20° C. greater than Θ0 by condensation (at 28) of the same steam compressed from Θ0 to Θ2, or by the condensation of auxiliary steam evaporated at Θ0-5° C. by condensation of the vapors formed by the drying process.

15 Claims, 3 Drawing Sheets

DRYING PROCESS AND TOWER FOR PRODUCTS IN GRAIN FORM

BACKGROUND OF THE INVENTION

French patent No. 989 842 describes means for reducing the amount of thermal energy consumed by the evaporation of the water contained in vegetable grains at the time of the drying required for their conservation.

This patent claims "heat exchanger elements mounted in the pre-heating area, which elements transmit to the product to be processed the heat of the vapours from the heating area".

A simple calculation shows that this device could permit an energy saving of between 10 and 20% through contact between the grains and vanes mounted on the tubes condensing a part of the steam produced by the drying of a grain containing 35% moisture.

West German patent No. 3 516 062-A1 demonstrates the same concern on the part of the inventors to save energy in the drying of granulous materials; it accomplishes the drying through contact with the walls of 186 vertical tubes and by the licking of gas, steam or air on the internal helical surface of a stream of granulates dropping between two helical walls borne by the tube. This process seems far too costly to sell easily given the present position regarding the cost of energy and appears to consume over 800 thermal KWH per ton of water evaporated.

Furthermore, the volume of gas, steam or air to be conveyed can be used only once.

Finally, as in patent No. 989 842, the recovery of the energy corresponding to the latent heat of the evaporated water is only partial and probably does not exceed 20% when operating with air or gas between 40° and 90° C.

A third patent, Belgian patent No. 715694 entitled "Methode et appareil de sechage en vrac par congelation" ("Method and apparatus for bulk drying by freezing") is of great interest as regards the drawings but, although this patent states, several times, that it proposes to ensure continuous circulation of the frozen granulate bodies, none of the drawings and none of the descriptions indicate the means for so doing, nor does any means indicate recycling of the drying fluid, far less any effect of fluidizing the frozen granulate bodies, by a fluid.

Finally, the apparatus described is supposed to consume between 1000 and 2000 KWH per ton of evaporated water.

The object of the present invention is to realize a far greater energy saving than that which might possibly be achieved by patent No. 989 842.

In this patent, part of the recycled air emerging saturated from the condenser tubes (4) is, in fact, superheated only once before entering the non-perforated ducts (6) to divide into two streams: one travelling upwards through all the grains and commencing the drying operation until it emerges saturated (at 5), the other travelling downwards through all the grains to complete their drying until it emerges saturated (or otherwise) in the ducts (7) and restitutes at most 0 to 30% of the energy expended during the pre-heating of the grains.

On the other hand, in the present invention, all of the drying fluid (gas, steam or air) enters saturated with steam produced by the drying at a temperature $\Theta 0$ defined by the thermal sensitivity of the grains to be dried, and is then superheated a great many times, without any fresh supply but taking with it the maximum quantity of energy that can be recovered by condensation. The present invention cannot be applied to sugar or other very hygroscopic products.

As an illustration of thermal "sensitivity", the temperature $\Theta 0$ will be set, for example, to 40° C. approximately for the purpose of drying sunflower seeds, certain oleaginous seeds and seeds for sowing; to 60° C. approximately to dry starch containing corn; and to 100° C. or more to dry mineral or organic products that are hardly hygroscopic, such as silica sand for glass-making or the granulates intended for coating for road surfacing purposes, or again, fodders.

However, and this is what sharply distinguishes the present invention from those of the previous two patents, the drying fluid will be slightly superheated 2N times (with N varying from 2 to 20) and saturated 2N times when passing through and drying by fluidization a thin layer of material to be dried, carried by perforated funnels and not by solid ducts as in French patent No. 989 842. To facilitate the passage of light products such as dusts, powders or follicles of corn (or of grains) upwards and to prevent as far as possible the passage of the grains to be dried downwards, the holes in the funnels will advantageously be orientated obliquely in the direction of circulation of the grains, and at the same time wide enough to let through light bodies. The same drying fluid is thus progressively laden with steam (or solvent vapour) and emerges saturated with water (or solvent) at a temperature differing as little as possible from the temperature $\Theta 0$. In the case of water, calculations show that, per ton of water evaporated, these products can be dried by consuming a maximum of:

140 KWH of electricity per ton of water when $\Theta 0 \approx 40°$ C.,

120 KWH of electricity per ton of water when $\Theta 0 \approx 60°$ C.,

80 KWH of electricity per ton of water when $\Theta 0 \approx 100°$ C.

The feasibility study shows, moreover, that, for the same equipment purchase cost, it is possible to evaporate 1 ton of water at $\Theta 0 = 40°$ C., 1.5 to 2 tons of water at $\Theta 0 = 60°$ C. and 3 to 4 tons of water when $\Theta 0 = 100°$ C.

Persons of ordinary skill in of the art know that the ponderal specific heat of steam is equal to 4 times the ponderal specific heat of air; they know that the thermal conductivity of water is approximately two times greater than that of air. Such persons will appreciate that the ventilation costs are almost divided by 4 upon changing from 10% water ($\Theta 0 = 40°$ C.) to 0% air and 100% water ($\Theta 0 = 100°$ C.).

Persons skilled in of the art also appreciate that the performance coefficients (COP) of the compressors range from 6 when $\Theta 0 = 40°$ C. to 10 or more when $\Theta 0 = 100°$ C.

These points explain the increasingly small specific consumption figures and ever lower installation costs as the temperature rises from 40° C. to 100° C.

SUMMARY OF THE INVENTION

The present invention thus provides a process for drying products in grain form with considerable energy recovery, characterized in that a drying fluid (air, gas or steam) enters at a temperature of $\Theta 0$, saturated with the steam produced by the drying of these grains and is superheated to a temperature greater than $\Theta 0$ through contact with crossed tubes, heated to $\Theta 2 > \Theta 0$, and then passes through perforated grills and the granular materials to be dried, fluidizing them and drying them, and characterized in that the same drying fluid, increasingly laden with steam, reproduces by 4 to 40 times or more this superheating, this drying and de-superheating fluidization and emerges in counterflow in relation to the circulation of the granulous products and at a temperature of $\Theta 1$, to be recycled under the first crossed tubes.

According to other characteristics:

the drying fluid is advantageously the steam to be removed by drying and the temperature $\Theta$ is slightly less than $\Theta 0$;

a portion substantially equivalent to the steam evaporated by drying is compressed at a temperature of $\Theta 2 > \Theta 0$ to condense at this temperature $\Theta 2$ in the crossed tubes while the steam is recycled at $\Theta 0$;

the drying fluid is compressed to raise its temperature from $\Theta 1$ to the temperature $\Theta 2$ sufficient to supply, through direct condensation in the crossed tubes, the heat necessary for the drying evaporation;

according to one variant, the steam saturated drying fluid emerging at $\Theta 1$ is sent into a condenser, where the steam formed by the drying condenses by boiling an intermediate liquid before returning to $\Theta 0$ in the drying circuit and the gas formed by evaporation of this intermediate liquid is compressed to reach a temperature of $\Theta 2$ higher than $\Theta 1$ in the said crossed tubes.

By contrast with West German patent No. 3 516 052-A1, the implementation of the invention accomplishes the drying by 2N fluidizing passages through the granulous materials, in such a way that the heat capacity of one and the same drying fluid is used 2N times (with N ranging from 1 to 20 for example) and in such a way that, through fluidization, the drying fluid has many more intimate contacts with each of the granulates than is permitted by patent No. 3 516 062-A1, and it also prevents the grains from coming into contact with a very hot wall, as could be the case as regards patent No. 3 516 062-A1 which, for this reason, could not be used to dry seeds for sowing or fragile grains such as sunflower seeds.

By comparison with Belgian patent No. 715 694, the present invention facilitates the circulation of the granulates through fluidization by providing numerous perforated grills each having numeous holes.

No description will be given herein of either the storage of the grains, their distribution, the cooling systems, or the preheating of the grains using the heat of the air leaving the cooler: all of which are solutions widely known in the art.

The invention also covers a drying tower implementing the above process and whose main design principles and structural and operational features will become apparent from the description that follows.

BRIEF DESCRIPTION OF THE DRAWING

This description is given with reference to the annexed drawings, wherein.

DESCRIPTION OF THE PREFERRED EMBODIMENTS

Figure 3:
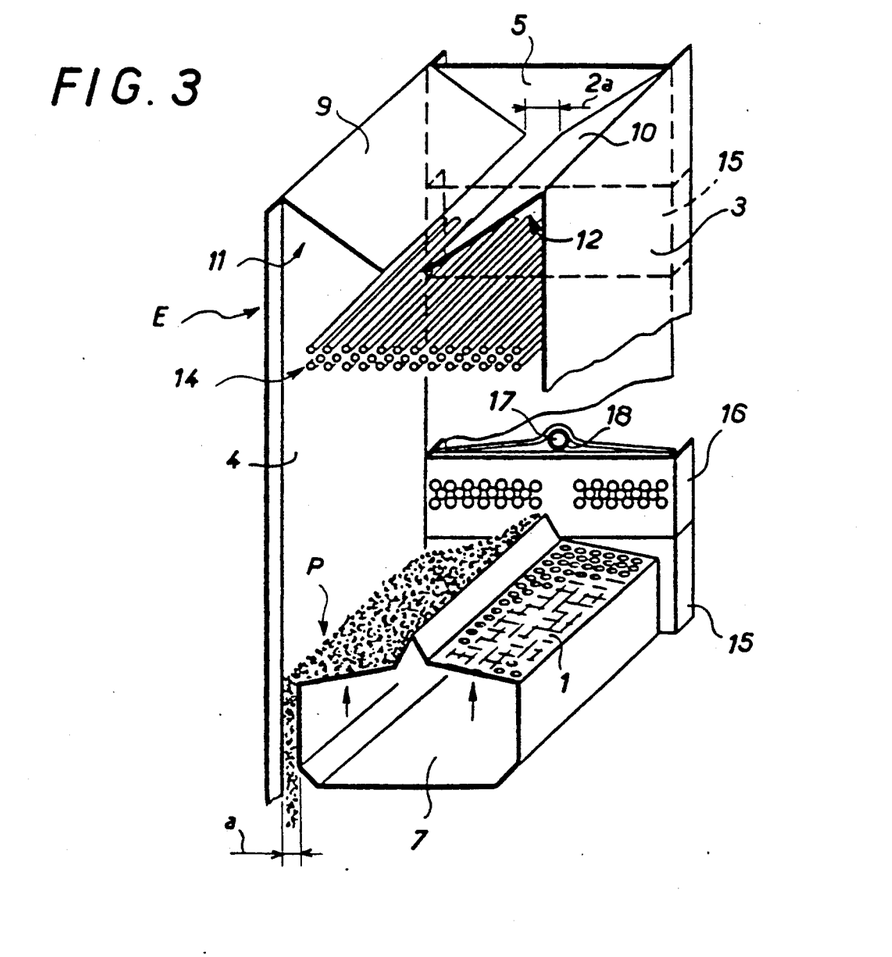
FIG. 3 is an isometric projection of a drying tower showing the way in which it is possible to mount one of the funnels as well as part of a layer of heating tubes.
Figures 4, 5, 7:
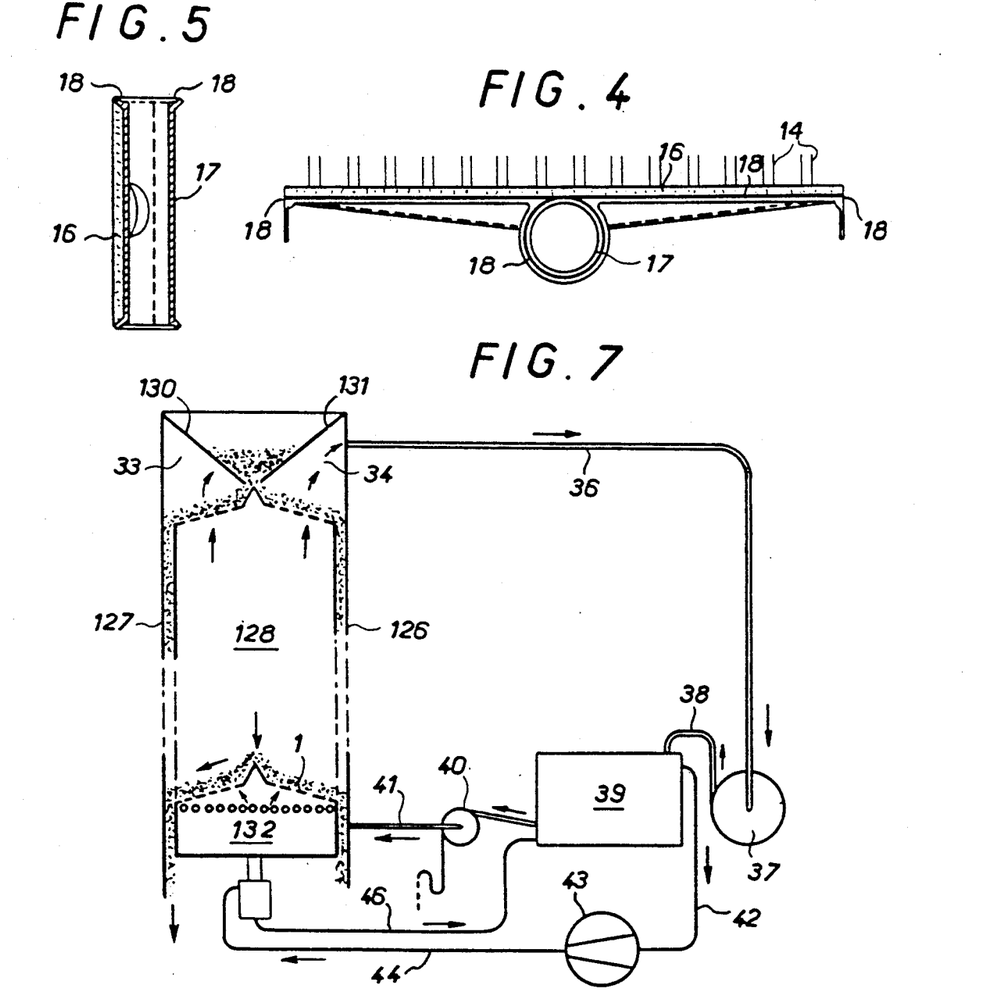
FIGS. 4 and 5 show respectively in top views and in profile a "feeder" for supplying the heating tubes of FIG. 3.
FIG. 7 is a diagram of an installation operating according to an alternative form of the process.
Figure 6:
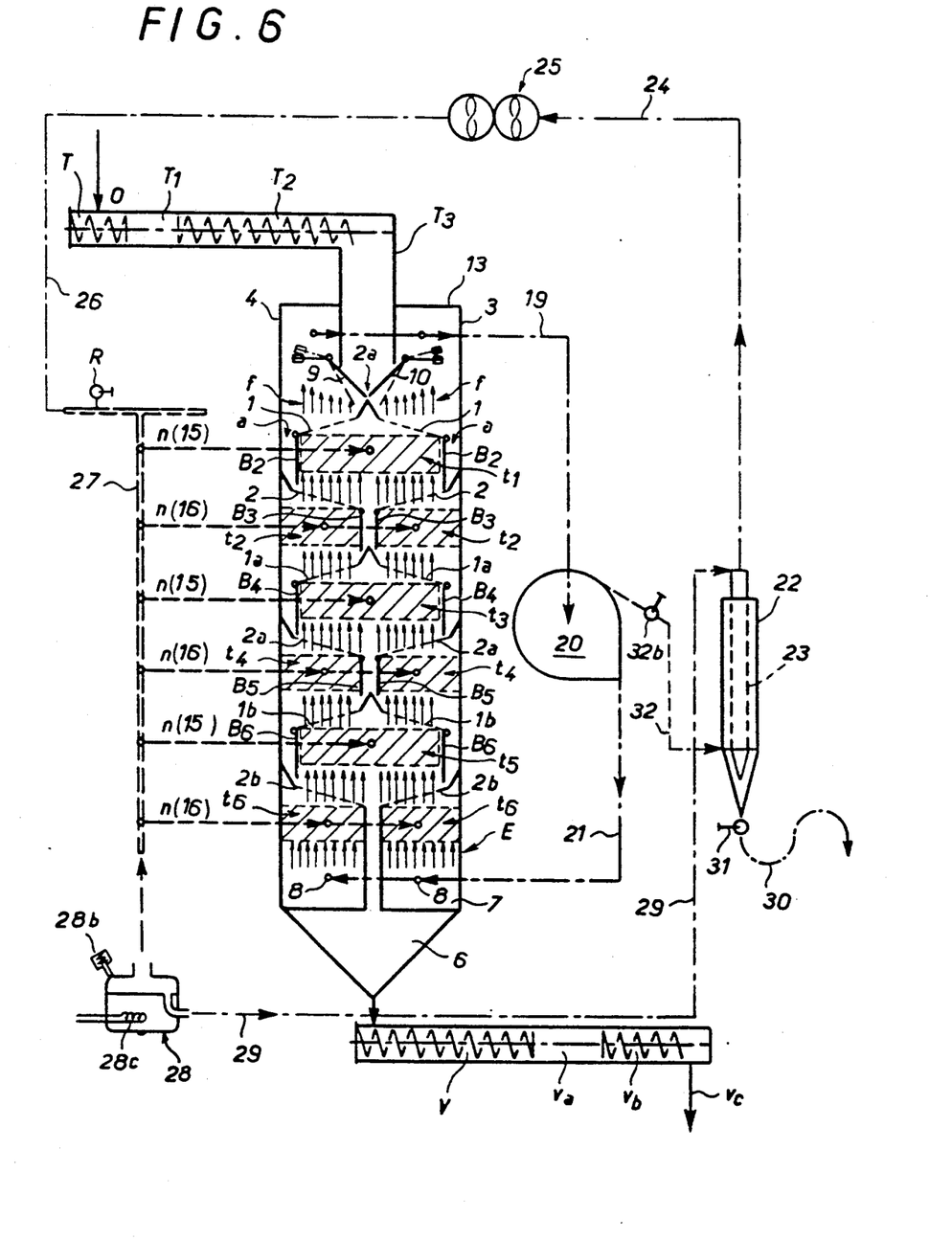
FIG. 6 is a diagram of a drying installation comprising a tower of the type partially illustrated in FIG. 3.

With reference to these figures, a schematic representation is given in FIGS. 3, 6 and 7 of a tower having a right-angled parallelipipedic shape, hence a rectangular horizontal cross-section and which, in the case under consideration, is suitable for operation at a pressure inside the drying tower that differs little from atmospheric pressure. However, it would not be a departure from the present invention to have inside the tower a pressure that was lower or higher than atmospheric pressure. In this case, it would be preferable for the tower to have the shape of a cylinder of revolution.

Figure 1:
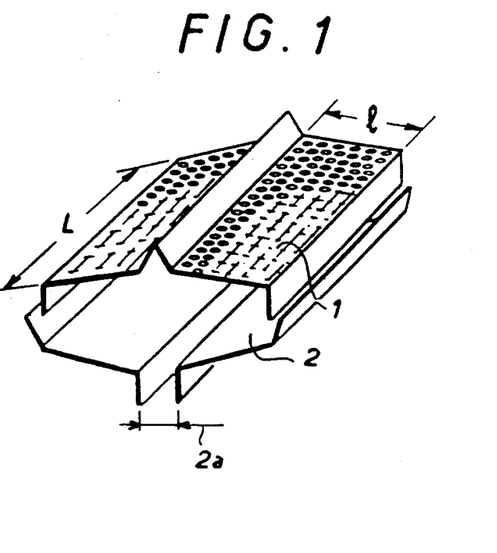
FIG. 1 is a perspective view of a pair of funnels used in a drying tower according to the invention.

Thus, the installation having such a parallelepipedic tower E, illustrated in FIG. 6, comprises, as schematically represented by the arrow "O" a device for admitting the material to be dried. The latter is admitted into a feeding device, for example of the screw conveyor type T, discontinued at T1 and extended at T2. At the outlet of this device is provided a vertical chute T3 closed by swing flaps 9–10 and penetrating inside tower E through its upper wall 13. Inside the latter is mounted a pair of perforated plates, hereinafter referred to as grills or male funnels 1 because they are divergent (as illustrated in more detail in FIG. 1), these grills being separated in the middle by a solid prism placed below flaps 9–10 so as to distribute the flow of granulates into two layers that are as equal as possible, one of these layers being schematically represented at P in FIG. 3. The front face (not represented) of tower E is designed to be removable, and the grills just mentioned are mounted so as to enter and leave the enclosure as do the racks of an oven or the shelves of a refrigerator; in addition, these grills can be associated with a system (not shown) capable of imparting thereto a vibratory movement. These grills or male funnels 1 have the dimensions L and l indicated in this FIG. 1. The slope of the roof or that of the faces of the dihedron which is the form of these male funnels will be adapted to each material to be processed, the purpose of this shape being to allow this material to flow from the center towards each of the opposite lateral faces 3–4. Wall 5 (FIG. 3) forms the back of tower E. Spaces 11 and 12 contained between each of planes 9 and 10 and the horizontal plane passing through the upper edge of funnels 1 receive the steam leaving the drier (as will be seen hereinafter). Furthermore, the holes in the funnels will preferably be orientated in the direction of circulation of the grains over these funnels. In space t1 located below funnels 1 is arranged a bundle of plugged tubes 14 (see FIG. 3) advantageously inclined (for example with a slope of 1%) below the horizontal plane from the plug to horizontal feeders n 15 and n 16 (FIG. 6), also schematically represented at 15–16 in FIG. 3. As to these feeders, it will be noted, with reference to FIGS. 4 and 5, that they are designed to be supplied with steam, in accordance with the process of the invention, by means of a tubular section 17. They are assembled to one another by heat (120°) resistant joints 18. A vertical feeder N is also provided to supply the said horizontal feeders.

On either side of this bundle t1 of tubes 14, articulated flaps B2—B2 are provided to force the steam to pass through these tubes, as will be seen hereinafter.

Below this same bundle t1 of tubes 14 is mounted a pair of perforated plates 2 or so-called female funnels (FIG. 1) the inclined planes of which are intended to return the granulates from the periphery to the center. The dimensions "a" (FIG. 6) and "2a" (FIG. 1) illustrate the corridors designed to allow through the material from a male funnel to a female funnel and from a female funnel to the following male funnel (as will become apparent hereinafter). Corridor 2a is delimited by two flap shutters B3—B3 placed at equal distances from the edge of the solid prism joining the two perforated male funnels 1a—1a.

Space t2 itself, located below female funnels 2, is also occupied by a bundle of plugged inclined tubes of the tube bundle 14 type as described above.

Below the male funnels 1a—1a there is again provided in space t3 a type 14 tube bundle above a pair of female funnels 2a—2a identical with female funnels 2—2 of the preceding stage, and so on down to the last pair of female funnels 2b—2b located below the pair of male funnels 1b—1b, these two pairs of funnels delimiting space t5.

Below this pair of female funnels 2b—2b, space t6 is occupied by a nest of tubes of the tube 14 type supplied via tubular intakes 8—8, in space 7 ending in a funnel 7a forming the base of tower E.

This funnel emerges in screw conveyor V discontinued at Va and extended at Vb as far as the outlet at VC.

The above-described installation further comprises: a fan 20, a cyclone 22 the center of which is provided with a perforated tube 23, a booster 25, plug valves 32b and 31 and connecting pipes suitable for conveying fluids, as will be seen hereinafter. At the base of the vertical feeders N (reference 27, FIG. 6) is located a water reservoir 28 surmounted by a calibrated valve 28b with a heating resistor 28c.

We shall now describe the operation of an installation as described above (see FIG. 6). During this description, it will be possible to follow:
1. The progress of the granulates,
2. The circulation of the drying steam
3. The circulation of the heating steam.

1. Progress of the granulates

The granulous materials introduced at O travel in the screw conveyor T, are compressed as it were in the discontinued portion of the conveyor, T1 and taken up again at T2 by the screw conveyor to drop down at T3. Supplies to tower E are controlled means of two flaps 9-10, which thus regularly distribute onto each of grills 1 the granulous material which travels at speed V under the fluidizing effect of the ascending steam (arrows f) until it falls by pushing flaps B2—B2 onto the two converging female funnels 2 which convey it between flaps B3—B3 to the center of diverging funnels 1a—1a, and so on until it drops into funnel 6, then into screw conveyor V to be compressed in discontinued screw portion Va as far as portion Vb, which pours it into Vc.

2. Circulation of the drying steam

The steam, which travels in a counterflow direction in relation to the granulates, enters at a pressure above atmospheric pressure and at more than 100° C. at 8—8 below crossed tube bundles t6—t6 which are heated to 120° C. After licking these tubes, the steam is superheated to 105° C., then passes through holes in grills 2b—2b and the granulates descending through its fluidization and the steam completes their drying by saturating. To the left and the right of the tubes or bundle t5, flaps B6—B6, pushed by the steam against the descending grains, prevent or restrict its passage and forces it to lick the crossed tubes of bundle t5 and to superheat to 105° C. in contact with their 120° C. surfaces, and to pass through the layer of granulates fluidized by it and dried, and so on until the final passage through the last perforated grill, 1—1 and the granulates descending before drying. Of course, the two flaps B1—B1 limit the escape of the steam via T3 and plug T1 practically prevents this escape. Similarly, the plug formed at Va in screw conveyor V decreases the escape of steam at a pressure greater than atmospheric pressure by circulation.

After this final passage through the granulates, the steam, the pressure of which is barely in excess of atmospheric pressure (to prevent any air from entering) is drawn in by fan 20 and delivered at higher than atmospheric pressure beneath the tubes of bundles t6—t6, and starts the previous circuit over again.

The steam produced by the drying thus increases the total volume of the drying fluid and it is extracted by plug valve 32b to serve as a heating fluid.

3. Circulation of the heating fluid

In steady operation, the steam from 32b enters cyclone 22, where jets 23 (FIG. 6) spray the condensed water in such a way as to eliminate the abrasive dusts entrained by the drying process and this steam travels off to the compressor 25 via conduit 24 to be compressed and have its temperature raised to $\Theta 2$ (120° C.) ($\Theta 2$ greater than the temperature, $\Theta 0$, of admission to tower E). Compressor 25 delivers this steam via conduit 26 to vertical feeder 27.

The bottom of said feeder 27 is connected to water reservoir 28, which is also connected to conduit 29 for circulating the condensed water at $\Theta 2$ to supply tangentially the cylinder prolonged inside cyclone 22 by a screen 23.

The condensed water and the sludges are permanently removed by siphon tube 30, which is opened by needle valve 31.

Before introducing the products to be dried, a check is made to ensure that valves 31 and 32 are closed. Tap R is opened and the water reservoir at 28 is heated by heating coil 28C. After a few minutes at boiling, the major part of the air is discharged via R; compressor 25 is then started up, fan 20 is turned on and, as soon as the air reaches 100° C., the granulates are introduced. Gas circulation is thus established with heating, hence drying and enrichment of the air with water vapour; the excess volume escapes through the granulate inlet and outlet orifices.

When the air has been almost completely replaced by the steam, valve 32b is opened, heating of the water reservoir is halted, the reservoir being replenished by the condensation of the water from the heating tubes 14 of the different bundles of tubes (t1 to t6) cooled by the drying. Valve 31 is then opened and the level of discharge of the sludge-laden condensation waters is adjusted.

Energy saving commences

It is quite obvious that, during the period of warming up descrived above, the granulate flow rate has to be reduced or the granulates have to be recycled as the heat provided by resistor 28c and the compressor alone is insufficient.

It will further be noted that, under normal operating conditions, the tubes of the tube bundles t1 to t6 are maintained at a constant temperature $\Theta2$ (for example 120° C.) through the condensation of the greater part of the drying steam, although the excess steam is removed via valve 28b, which regulates the positive pressure in chambers 7 and discharges any non-condensable elements to atmosphere.

Without taking into account the heat entrained by the granulates, 60% of which can be recovered by preheating the incoming granulates, such a drying installation according to the invention would consume only 88 KWH of electricity per ton of water evaporated for compressor 25 and fan 230, while drying installations of the tunnel type consume over 800 KWH of heat and 20 KWH of electricity respectively per ton of water evaporated.

For obvious reasons of economical construction, it is preferable for the pressure inside the drying tower according to the invention to differ little from atmospheric pressure.

In this case the horizontal cross-section of the tower will be rectangular, as previously indicated, and the fluidization funnels will alternatingly be dihedrons (as described earlier) sending the grains from the center to the periphery placed between two inclined planes returning the grains from the periphery to the center.

Figure 2:
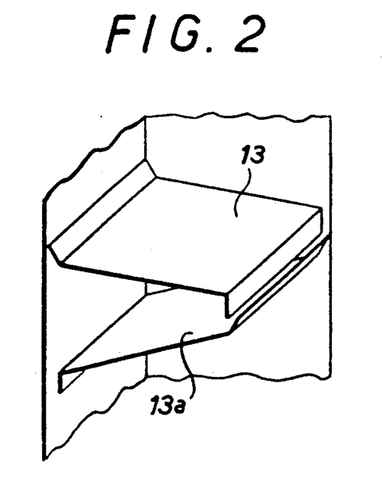
FIG. 2 shows an alternative design of the funnels that can also be used.

It would also be possible to use solely oblique planes bringing the grains from one lateral face towards the opposite face, now in one direction, now in the other (as, for example, in the form of embodiment illustrated in FIG. 2), where funnel 13 is identical with funnel 13a when pivoted 180° about a vertical axis.

In this case, it will often be preferable for the tower to take the form of a cylinder of revolution and for the perforated funnels to be shaped as bodies of revolution about the axis of the tower, alternatingly as Chinese hats and frustoconical rings. The superheating tubes would then have the form of concentric circumferences.

When it is preferred to use negative pressure, the pressure at the bottom of the tower should be slightly higher than atmospheric pressure.

If, on the other hand, a slight positive pressure is preferred, a pressure close to atmospheric pressure should be chosen for the top of the tower.

Each of these choices naturally has an effect on the choice of temperatures. A few examples of this are given below.

EXAMPLE 1

To dry products that withstand 100° C. and are not hygroscopic, containing only surface water and little or no bound water, it will be possible to use as a drying fluid water vapour at a temperature in the region of 100° C. on condition that, in order to prevent air from entering, the pressure in the tower be slightly positive in relation to atmospheric pressure.

In this case, following pressure losses inevitable along the stages of the tower, $\Theta1$ will be slight less than $\Theta0$.

A man of the art can choose a single funnel contained between four vertical walls and even, if necessary, cause this funnel to vibrate.

With or without vibrations, he can also choose several funnels contained between vertical walls transporting the grains from one wall towards the opposite wall, now in one direction, for one, now in the opposite direction for the one below, as for the one above.

Again with or without vibration, he can alternate so-called male funnels transporting the materials from the centre towards each of the opposite side faces and pouring them onto the so-called female funnels returning the materials towards the centre of the two lateral walls.

To take only the case previously described with reference to the drawings, the driers of this type will be composed of a number N of male funnels and of a number $N-1$, N or $N+1$ of female funnels having, preferably, the same drying capacity.

A man of the art will thus have at his disposal numerous defined elements and will be able to adapt the slopes of the male and female funnels according to the type and moisture of the products to be dried representing a mass A of water to be evaporated.

For this purpose, he will be equipped with a slope measuring device, not described here, composed of several funnels having a length 1 and a width L, arranged in such a way that the slope of the funnels can vary between 0 and 40%.

With this apparatus, he will determine $\alpha$ air, $\alpha$ air being the angle with the horizontal formed by the funnels in order for the dry grains to be dried to be displaced by fluidization at the speed v (chosen by him) under the effect of the air having a density d air passing through the grains at a speed V compatible with good drying.

For fluidization, we can write the following equation:

$$SIN\ \alpha\ air = \frac{v}{d\ air \times V2}$$

or $$SIN\ \alpha\ water = \frac{v}{d\ water \times V2}$$

As $v$ and $V2$ are constants, we can write $SIN\ \alpha\ water = SIN\ \alpha\ air\ \frac{d\ air}{d\ water}$ Then the technician will carry out the same measurements with moist grains and deduce a second value of $\alpha$ therefrom.

He will note that these two values are close enough to choose the higher of them, hence the same slope for all the funnels of the same drier, simply taking it into account that the flow rate v of the grains will be faster at the end of drying than at the beginning.

Under these conditions, all the funnels will be identical and the flow rate v will not be constant.

If we call the external surface of a layer of tubes S, the number of layers n and the coefficient of exchange between the tubes at $\Theta2$ and the drying fluid (in watts per meter and per degree of difference) K, this number K will be constant since it depends solely on V, which is constant and which determines the flow rate of the drying fluid through the funnels.

The technician will choose $\Delta\Theta$, the average temperature difference between $\Theta0$ and $\Theta0+2\Delta\Theta$, the output temperature of the drying fluid. This value of $2\Delta\Theta$ represents the superheating of the fluid, which enables it to dry the materials.

If we call $\lambda$ the ponderal latent heat of water evaporation and the quantity of water evaporated per hour on each element with a surface area of $L \times 1$ q, we shall obtain the following equation:

$$q = \frac{2\, nSK\Delta\Theta}{\lambda}$$

Knowing q, the technician, who will have to calculate for a drier evaporating a mass A of water vapour, will initially disregard the thermal energy removed by the dry materials.

The technician will thus be able to chose m and N in such a way as to satisfy one of the following relations:

$$2\, mN \geq \frac{A}{q} \quad \text{or} \quad m\, (2N \pm 1) \geq \frac{A}{q}$$

To ensure a uniform thickness of granulous materials on the fluidizing and drying grills, the latter must not be very wide, generally less than 3 meters, and n will often be very high.

The technician will thus choose, as he wishes, between a single very high module or several reasonably high modules placed side by side, and he will tailor his solution to the needs of his client.

In any case, in steady operation, it is noted that the steam introduced at a pressure slightly above atmospheric pressure and at a temperature of $\Theta0$ enters the lower compartment 7, encounters the tubes 14 heated to $\Theta2$, superheats by $2\Delta\Theta$, leaves through the holes in the first series of funnels and then passes through the layer of granulates, completing their drying and losing $2\Delta\Theta$. The steam then encounters further layers of tubes, superheats by $2\Delta\Theta$ and then passes through the holes in the following series of funnels and the layer of granulates to be dried, losing $2\Delta\Theta$, and so on 2N times (6 times here).

Because of the pressure loses in the drying tower, the steam comes out at a temperature of $\Theta < \Theta0$, and it is sucked in by fan 20, which removes therefrom the steam produced by the drying and returns it to the lower compartment 7, and so on. In a direction opposite to that of the drying fluid vapour, the granulous products introduced descend onto the first series of funnels, are dried by fluidization as they move away from the center, drop onto the second series of funnels, which returns them, by fluidization, to the center, drying them until they drop onto the following series of funnels and so on, until they leave the last funnel after a final drying fluidization stage, via the two orifices provided between compartment 7 and lateral walls 3 and 4.

Conduit 32 sends the steam produced by the drying into the cyclone or cyclones 22. As already indicated, the steam, from which the dusts have been removed leaves through the top of the cyclone and passes through conduit 24 to the compressor 25, which raises its pressure in such a way that it can condense at a temperature of $\Theta2$ in tube bundles 14.

It will be noted that, without departing from the scope of the present invention, one could also pass all of the steam drying fluid and steam produced through cyclone 22, which would remove all the dusts from the circuit.

It will further be noted that, in the case of coffee beans, which have a certain thickness, stages of simple funnels, without tubes 14, could be provided to enable the bound water to migrate towards the periphery of the grain.

The device described in this first example can be applied to all granulous or powdered non-hygroscopic products, such as silica sands, granulates for road surfacing, granulated or very finely divided fodders, coffee, cocoa, etc, but it is not suitable for grains and other products that can be dried by an apparatus as described below.

Grains such as corn, wheat, barley, rapeseed, sunflower seeds, etc. cannot be subjected to a temperature of 100° C. without damage.

In addition, as they contain bound water, and as the rate at which this water evaporates is quite high at the start of drying, when the grain contains over 20% of water, drops as the water content approaches 15%, the calories to be supplied in each stage increase from the bottom to the top of the tower.

To solve this problem, the technician would therefore have to construct as many different apparatus as there would be types of grain to dry, which would be impossible; he will thus have to devise a drier suitable for the grains that represent the greatest tonnage and particularly in France, as in many other countries, he will construct an apparatus that is suitable for corn; in Ireland and Scotland, and in other countries nearer the Pole, he will design an apparatus that is suitable for drying barley, etc.

To adapt this drier to other grains, the user will modify the temperature $\Theta0$; which is always assumed to be below 100° C.

EXAMPLE 2

Solely by way of example, we shall now describe the characteristics of a drier suitable for drying corn for the production of starch, for which $\Theta0=60°$ C.

For reasons of cost price, he will choose $\Theta2=80°$ C. for example.

In the first place, a man of the art will choose a fluidization rate of V and he will determine from experience the rate v at which the corn grains travel over the fluidization funnel and grills.

Using the slope measuring apparatus, the technician will measure the slope to be given to the fluidization funnels and grills to ensure that the dry grains travel over the funnels at a rate v, for a fluidization rate V of air density d air, and he will deduce therefrom the slope to be given to the grills in order to obtain this rate v with fluidization V with moist air at 60° C. having a density d'air using the following equation:

$$\text{SIN } \alpha \text{ air at } 60° = \text{SIN } \alpha \text{ dry air } \frac{d\text{ air}}{d'\text{air}} = \frac{1.29}{0.921} = 1.40$$

The technician knows, moreover, that corn with 35% moisture loses its moisture far more quickly at the start of drying than at the end.

If we take as a unit the quantity of heat in watts to be supplied to the corn containing only 15% water, the quantities of heat to be supplied, from the first bottom stage to the 25th, top stage will be approximately represented successively by the following 25 coefficients: 1;

2; 2.5; 2.5; 2.5; 2.5; 3; 3; 3.5; 4; 4; 4; 5; 5.5; 6; 6.5; 7; 7.5; 8; 9; 9.5; 10; 14; 20; 23.

The sum of the coefficients is 165.5.

The technician will calculate the number W of watts to be supplied in order to obtain the desired evaporating power.

By dividing W by 165.5, the technician will find the power in watts to be supplied to the first bottom stage in order to reach, in the 25 stages, the evaporation capacity characterized by W.

The technician decides to place a single layer of tubes beneath the first funnel.

Now he has standard grills having a length l and a width L connected to a defined standard external surface S of tubes per layer of tubes.

For the chosen rate V there corresponds a coefficient K of exchange between the drying fluid at $\Theta 0$ and the heating tubes at $\Theta 2$.

Furthermore, temperature $\Theta 0$ is constant at 80° C., while the temperature of the drying fluid rises gradually above $\Theta 0$ from one stage to another until it reaches $\Theta 1 = 69°$ C. at the outlet from the last stage. The temperature difference $\Theta = \Theta 2 - \Theta$ thus drops progressively from 19.7 to 6.6 from the first to the last stage.

The technician could thus precisely satisfy the heat requirements of each stage by plugging certain tubes, while leaving them in place to ensure correct distribution of the drying fluid. He will place the following numbers of layers beneath each of the successive 25 stages: 1; 1; 1; 1; 1; 1; 1; 2; 2; 3; 3; 3; 4; 5; 5; 7; 7; 8; 8; 11; 11; 20; 20; 40; 40.

As a result of the increase in mass and of the decrease in density, which drops from 0.921 to 0.773, the fluidization rate V will be multiplied by 1.29 and the fluidization effect will be multiplied by 1.66 from the 1st. bottom stage up to the 25th. top stage, while the corn grains will have increased in volume in a proportion of approximately 17%.

This will have to be allowed for when choosing the slope to be given to the perforated grills of the upper stages.

Finally, the moist air at 69° C. composed of 35% water will have to pass through a costly condenser, where the condensation of the water vapour produced by the drying will cause a liquid of the Freon type to boil at about 55° C.

In place of the 10% obtained with pure water, a performance coefficient (COP) of approximately 8% will be obtained by compressing this Freon á $\Theta 2 = 80°$ C.

FIG. 7 diagrammatically represents a corn drier and the energy recovery device.

In this figure, there is diagrammatically represented at 1 the male funnel corresponding to the first bottom stage and at 125, the 25th. top stage, stages 2 to 24 not being shown.

The two lateral walls of the drier are designated at 126 and 127 and the back wall of the drier at 128.

The front wall, not shown, has been removed.

The figure also shows the two solid walls 130 and 131 inclined in such a way that the corn grains descend correctly onto the upper edge of the 25th. stage and are uniformly distributed along each of the funnels of this stage.

We further see the duct 132 integral with the first funnel stage, and the two spaces, 33 and 34, limited by the horizontal plane passing through the upper edge of the 25th. stage and through the inclined walls 130 and 131. From 33 and 34, the water saturated air at 69° C. is collected by a bottom duct, not shown. From there, along the diagrammatically represented duct 36, the moist air is drawn in by the fan 37, which delivers it, through duct 38, into condenser 39, where the steam produced by the drying condenses from 69° C. to 60° C., causing the evaporation of the auxiliary liquid, of the Freon type, boiling at approximately 55° C.

Finally, the saturated air at 60° C., rid of the waters and sludges at 40, is sent, at a pressure slightly above atmospheric pressure, through the horizontal duct 41 located at the bottom of chamber 132.

The auxiliary liquid evaporated at 39 is delivered via pipe 42 to compressor 43, which raises its pressure to such an extent that it can liquefy at the temperature of $\Theta 2 = 80°$ C. in the tubes, not shown and the number of which is defined above.

From the compressor, the compressed gas is sent, via pipe 44, into a vertical tube distributing the gas supplying calories in the tubes for condensation at 80° C. which restore to the air circuit the calories required for evaporation ocf the water to be removed by the drying process.

To start up this drier, compressor 43 and fan 37 are started simultaneously and introduction of the grains commences when a temperature of $\Theta 0 = 60°$ C. is reached.

In normal operation, the corn grains drop down onto the upper edge of the 25th. stage and are distributed as well as possible over the opposite two slopes of the fluidization funnels.

They descend by fluidization, from one stage to the next, until they leave the drier in the intervals located between duct 139, integral with the 1st. bottom stage of the funnel, and two lateral walls 126 and 127 of the drier.

Travelling in the direction opposite to that of the grains, the saturated air at 69° C. that has entered at 132 is superheated to 60° C. in contact with the tubes containing the gas that is condensed at 80° C. and then passes through the grills of the first stage and the corn grains, which it finishes drying.

The air emerges at approximately 60.3° C., saturated, and is superheated to 61.6° C. by the tubes at 80° C. and, after passing through the grills of the 2nd. stage and the corn grains, it emerges saturated at approximately 61° C., and so on, until it is superheated from 68° C. to 78° C. by the 40 tube layers of the 25th. stage before passing through the grills and the moist grains that saturate it and bring its temperature to approximately 69° C.

The saturated air at 69° C., collected by the duct, is drawn in through duct 36 by fan 37 and discharged by it into duct 38 and into condenser boiler 39.

In the condenser, the air condenses all of the steam produced by the drying process and rids itself of the sludgy water in separator 40 before completing the circuit in duct 132, after passing through duct 41.

Condenser boiler 39 causes a Freon type liquid, condensed at 80° C. in the glove finger shaped tubes, to boil in the region of 55° C.; the gas formed is compressed in the region of 9 bar by compressor 43 so as to prepare for its condensation at 80° C. in the tubes.

The ventilation system consumes approximately 22 KWH per ton of evaporated water and the compressor approximately 76 KWH per ton of evaporated water.

Calculations show that this type of drier can consume approximately 120 KWH of electricity per ton of water evaporated; it is thus markedly superior to the conventional driers which consume approximately 800 KWH of heat and 20 KWH of electricity per ton of water evaporated. However, the above description shows that this apparatus would be far too expensive to construct, given the energy cost, as long as it is not possible to reduce the costs by building it out of plastic and on a mass production basis.

For the time being, therefore, it will be necessary to replace such differentiated stages as those described above by the standard stages provided for in the first example.

To adapt this drier to other grains, and whatever the equipment chosen, the temperature of $\Theta_0$ can be lowered to 40° C. or even less without this resulting in anything other than a reduction in capacity and an increase in electricity consumption.

Figure 8:
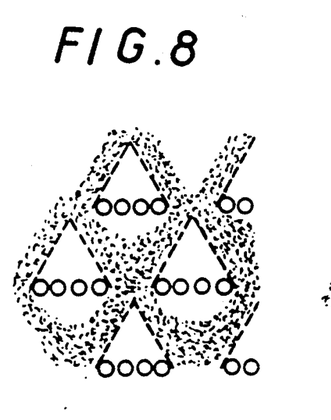
FIG. 8 is a diagram showing an area of the tower according to the invention occupied by a granulous material to be dried as a function of differing inclinations of the funnel walls and discontinuous operation.
Figure 9:
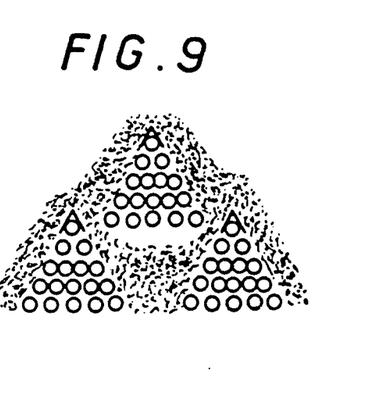
FIG. 9 corresponds to FIG. 8 without the funnels.

Without departing from the scope of the present invention, the perforated grills can also be more inclined than required for fluidization and the drier can be filled with granulous materials, as shown in FIG. 8. It is also possible to dispense with the grills, as illustrated in FIG. 9.

Of course, the above drier adapts to all devices for introduction, continuous or otherwise or for extraction, continuous or otherwise, with or without preheating of the materials.

All the grains and all the equipment must, of course, be carefully heat insulated.

The steam may be eliminated and the drying fluid may be a solvent, and the carrier gas may be air or any gas without departing from the scope of the present invention.

Instead of providing for glove finger shaped tubes and removable grill funnels, superheating tubes could be provided, these tubes crossing the drier from one side to the other, as well as grills carried not by the side walls but by the back wall and by the front wall, without departing from the scope of the present invention.

Again, the temperature of all or part of the drying fluid can be lowered by the cold point of a heat pump, and all or part of this fluid can be superheated to refine the heating process, without departing from the scope of the present invention. It would also be possible to dispense with condenser 39 and to use a fan 37 powerful enough to compress the drying fluid from temperature $\Theta_1$ to temperature $\Theta_2$ sufficient to supply, through condensation in the crossed tubes, in series, in parallel or in parallel series the heat necessary for the evaporation produced by the drying process.

I claim:

1. Process for drying granulous products with substantial energy saving with a drying fluid selected from the group comprising steam saturated air, steam saturated inert gas, saturated steam and a solvent in counterflow with respect to said products admitted at the top of a vertical drying tower comprising a number of stages of superimposed perforated grills adapted to support said products with series of heating crossed tubes located under each of said grills, said process comprising: admitting said drying fluid at the bottom of said tower and under the first series of said crossed tubes at a temperature of $\theta_0$, ascendantelly circulating said drying fluid from one stage to the other, whereby said drying fluid becomes progressively saturated with steam evaporated by the granulous products being dried, and is superheated to a temperature greater than $\theta_0$ by contact with said crossed tubes under each stage and is thus heated to a temperature $\theta_2$ higher than $\theta_0$, and then passing said drying fluid through the perforated grill of each stage and through the granulous products supported by said grill, fluidizing said products and drying them in each stage until said drying fluid emerges from the top of said tower at a temperature $\theta_1$ less than $\theta_0$, and recycling said drying fluid to the bottom of said tower at said temperature $\theta_0$.

2. Drying process according to claim 1, wherein a quantity of steam substantially equivalent to the steam evaporated by drying is compressed by a compressor to a temperature $\theta_2$ higher than $\theta_0$ to condense at this temperature $\theta_2$ in said crossed tubes while a fan recycles the steam at the temperature of $\theta_0$.

3. Drying process according to claim 2, wherein said drying fluid emerging at the temperature of $\theta_1$ is sent by a fan into a condenser where the steam evaporated during the drying condenses causing the boiling of a liquid different from water before recycling it at the temperature of $\theta_0$, and wherein vapor formed by evaporation of said liquid is compressed to reach a temperature of $\theta_2$ greater than $\theta_1$ in said crossed tubes.

4. Drying process according to claim 1, wherein said drying fluid emerging at the temperature of $\theta_1$ is compressed to a temperature of $\theta_2$ sufficient to supply, without any other fluid, through direct condensation in the crossed tubes, the heat required for the drying process.

5. Drying process according to claim 1, wherein said drying fluid is a solvent.

6. Drying tower for drying granulous products with substantial energy saving with a drying fluid selected from the group comprising steam saturated air, steam saturated inert gas and saturated steam in counterflow with respect to said products, said tower comprising a number of stages of superimposed perforated grills adapted to support said products with series of heating crossed tubes located under each of said grills, an inlet at the bottom and under the first series of said crossed tubes for admitting the drying fluid at a temperature of $\theta_0$, an inlet at the top for admitting said granulous products, an outlet at the top of said tower for removing the drying fluid at a temperature $\theta_1$ from the top of said tower after said drying fluid has passed through each of said stages, and means for recycling said drying fluid to the bottom of said tower at a temperature of $\theta_0$, said perforated grills acting as fluidization support, and having holes oriented in the direction of circulation of the granulous products over perforated funnels.

7. Drying tower according to claim 6, wherein said crossed tubes are in the form of tubes closed at one end and are mounted in such a manner that they allow any liquid inside to drop from the opposite open end.

8. Drying tower according to claim 6, further including a front face adapted to be removable, and wherein said perforated grills are removable on slides or brackets.

9. Drying tower according to claim 7, further including a front wall and an opposite back wall, and wherein said crossed tubes cross the front wall of said tower and said grills are borne by said front wall and said opposite back wall.

10. Drying tower according to claim 6, wherein said tower is a cylinder of revolution, and wherein said grills are inclined rings and said crossed tubes are in the form of concentric circles.

11. Drying tower according to claim 6, wherein said funnels are alternatingly dihedrons which send the granulous products from the center towards the periphery placed between two inclined planes and return the products from the periphery towards the center.

12. Drying tower according to claim 6, wherein said funnels are oblique planes which bring the granulous products from one side face to the opposite face, first in one direction, then in the opposite direction.

13. Drying tower according to claim 6, further including means for vibrating at least the upper perforated grill.

14. Drying tower according to claim 11, wherein the perforated grills have the shape of steeply inclined dihedrons.

15. Drying tower according to claim 6, wherein the perforated grills are directly constituted by the heating crossed tubes themselves.

* * * * *